United States Patent Office 2,809,214
Patented Oct. 8, 1957

2,809,214

PURIFICATION OF MONOCHLOROACETIC ACID

Jerome N. Haimsohn, Ardsley, N. Y., assignor to New York-Ohio Chemical Corporation, a corporation of New York No Drawing. Application December 22, 1955,
Serial No. 554,620

5 Claims. (Cl. 260—539)

Monochloroacetic acid is a widely used industrial chemical. Large quantities of it are consumed in the manufacture of carboxymethylcellulose and in the preparation of 2,4-D. Although monochloroacetic acid is a white crystalline solid with a melting point of about 61° C., it is also sold in other forms such as a flaked product and as a concentrated aqueous solution. In the United States, monochloroacetic acid is generally prepared by the direct chlorination of acetic acid, using a suitable catalyst. While this appears to be an economical and widely used process, the industry has found it practically impossible to eliminate the formation of the troublesome by-product, dichloroacetic acid. The amount of dichloroacetic acid appearing in the ultimate product varies anywhere from 1% to 5% depending upon the technique of chlorination. For some uses, this amount of impurity is not harmful; however, in the largest consuming industries, it is frequently specified that the dichloroacetic acid content of the product should not exceed one-half of 1%. A great deal of experimental work has been carried on both in industry and in the universities in attempts to minimize the formation of the dichloroacetic acid by-product during the course of chlorination. Consequently, it is generally accepted in the industry that a commercially practical monochloroacetic process must tolerate the production of a small quantity of dichloroacetic acid impurity.

Distillation is a difficult method of separating dichloroacetic acid from monochloroacetic acid since they differ in boiling point only by a few degrees centigrade. Moreover, the vapor pressures are found to be practically the same throughout the pressure range in which it might be possible to effect a fractional distillation. Though it is possible to separate the two by fractional crystallization from a solvent such as $CCl_4$, the costs of this are found to be prohibitive because of excessive loss of $CCl_4$. Furthermore, there are a costly number of steps required to concentrate the extracted dichloroacetic acid to a sufficient strength so that only insignificant amounts of monochloroacetic acid are lost when it is ultimately purged from the process. Other methods known to have been used in the industry include such as the washing of monochloroacetic acid crystals with an organic solvent such as carbon tetrachloride in an attempt to selectively remove the dichloroacetic acid. Obviously, though, this has the same drawbacks as would the fractional crystallization process.

My invention is based on a unique and unexpected phenomenon encountered in laboratory experimentation. I have discovered, contrary to the normal expectations of anyone well versed in the art and science of centrifugation, that the dichloroacetic acid impurity in monochloroacetic acid flakes or crystals can be removed simply by centrifuging providing the monochloroacetic acid has been crystallized slowly in the presence of a small amount of solvent. I have found that under the stress of centrifugal force, it is possible to remove the dichloroacetic acid liquid from the monochloroacetic acid crystals and to collect the dichloroacetic acid bearing liquid forced from the centrifuge, and recover a much improved monochloroacetic acid flake product from the centrifuge discharge. I have found that it is possible to reduce the dichloroacetic acid impurity from the order of 1½% to 2% down to less than ½%, depending upon the magnitude of the centrifugal force, the time of centrifuging, the size of the monochloroacetic acid crystals, and the addition of a solvent.

I have found that the physical form of the solid monochloroacetic acid, which is dependent on flaking or crystallizing conditions, is a major factor controlling the operability of centrifugal elimination of the liquid, dichloroacetic acid containing impurity. More specifically, the crystal size appears to be the important variable. Rapid chilling produces a solid (flake) composed of small crystals, with large total surface, which permits greater liquid retention. Larger crystals obtained by slower cooling, however, present a smaller total surface, permitting more complete segregation of the liquid impurity, which is then more readily separable by centrifugation. Further, it should be noted that the solvent must be added prior to crystallization; if a solvent is added to the monochloroacetic acid and the acid subjected to centrifugation, the solvent has substantially no effect, as the following data show.

Consistent with this, I have found that the dichloroacetic acid content of technical flake monochloroacetic acid obtained from a rapidly chilled melt, with a commercial drum flaker, was reduced when centrifuged for long periods at high relative centrifugal forces (R. C. F.'s), but not always to a suitably low level. When the same technical monochloroacetic acid was remelted, mixed with a solvent and allowed to cool and solidify more slowly (favoring larger crystal growth), the dichloroacetic acid impurity was readily removed upon centrifugation. Under the latter conditions, the dichloroacetic acid content of regular technical grade monochloroacetic acid can be reduced from 1.5–2.5% to 0.5 or less dichloroacetic acid.

Any solvent may be used which is capable of dissolving in monochloroacetic acid containing a small amount of dichloroacetic acid as an impurity. Suitable solvents include carbon tetrachloride, water, perchloroethylene and the like. The quantity of solvent may be very small, i. e., on the order of 1% to 5%. Although large quantities of solvent may be used, the larger quantity does not result in proportionately enhanced results, so that it is preferred to operate with about 3% to 4% solvent.

It is preferred that the recrystallized monochloroacetic acid have an average particle size of from 0.1 to 0.5 mm. or larger.

*Example 1.*—Samples of a batch of technical grade monochloroacetic acid containing originally 1.7% dichloroacetic acid, were remelted and carbon tetrachloride was added to the melt prior to crystallization, except as noted. The crystallized product was centrifuged for 30 minutes, at 1000 × gravity, as follows:

| Sample No. | Wt. of $CCl_4$ Added, percent | Time of Crystallization | Crystal Size Major Fraction, mm. | Wt. Percent DCA after Centrifuging |
|---|---|---|---|---|
| 1 | 2 | 3.5 hrs | 0.8 ×1.6 | 0.4 |
| 2 | 8 | 3.5 hrs | 0.8 ×1.6 | 0.4 |
| 3 | 2 | 15 min | 0.1 ×0.5 | 0.5 |
| 4 | 0 | 15 min | 0.12×0.5 | 0.7 |
| 5 | [1]2 | 15 min | 0.12×0.5 | 0.7 |

[1] Added to solid after crystallization.

Upon direct centrifugation of the original technical monochloroacetic acid (1.7% DCA) under identical conditions, the DCA content was reduced to 1.2%. The addition of solvent to the melt facilitated the centrifugal elimination of the DCA impurity. An equal quantity of solvent added after solidification (crystallization) showed no improvement over the control, without solvent (samples 5 and 4, respectively).

*Example 2.*—Samples of the batch of commercial technical monochloroacetic acid, used in Example 1 (1.7% DCA), were remelted, and small quantities of water were added to the melt prior to crystallization. The crystallized product was centrifuged for 30 minutes, at 1000 × gravity, as follows:

I. Crystallization time less than 4 minutes:

| Run | Percent H₂O Added | Percent DCA |
|---|---|---|
| 1 | 1 | 0.59 |
| 2 | 2 | 0.54 |
| 3 | 4 | 0.37 |

II. Crystallization time less than 30 seconds:

| Run | Percent H₂O before Centrifuging | Percent DCA |
|---|---|---|
| 1 | 0.8 | 0.7 |
| 2 | 1 | 0.7 |
| 3 | 4.3 | 0.35 |

*Example 3.*—Samples from another batch of technical trade monochloroacetic containing 1.8% DCA were centrifuged for 30 minutes, at 1000 × gravity, as follows:

| Sample No. | Material | Time of Solidification | Wt. Percent DCA after Centrifuging |
|---|---|---|---|
| | Commercial Technical (Flake) | as is | 1.05 |
| | No. 1, remelted, 2% perchloroethylene added to melt, and crystallized. | 15 min | 0.62 |
| 3 | No. 1, remelted, 10% perchloroethylene added to melt, and crystallized. | 15 min | 0.49 |
| 4 | Same as No. 3, chilled rapidly | 30 sec | 1.07 |

*Example 4.*—Three samples from third batch of commercial flake monochloroacetic acid, containing 1.9% DCA, were slurried with varying quantities of carbon tetrachloride at room temperature with mechanical agitation for 10 minutes, then centrifuged for 30 minutes at 1000 × gravity. A fourth sample (No. 4) was remelted, 2% CCl₄, added to the melt, crystallized slowly, and the solid was then broken up and centrifuged under the same conditions.

| Sample No. | Wt. of CCl₄ based on MCA | Wt. of DCA after Centrifuging, percent |
|---|---|---|
| 1 | 100% | 0.58 |
| 2 | 50% | 0.86 |
| 3 | 25% | 0.93 |
| 4 | 2% added to melt | 0.42 |

I claim:
1. The process of purifying monochloroacetic acid which contains a small amount of dichloroacetic acid comprising crystallizing the monochloroacetic acid from a melt consisting predominantly of monochloroacetic acid and a small amount of dichloroacetic acid and also containing a small amount of a solvent, whereby large crystals are obtained and centrifuging the crystals to separate dichloroacetic acid therefrom.
2. The process of claim 1 wherein the crystals consist largely of crystals having a particle size of at least from 0.1 to 0.5 mm.
3. The process of claim 1 wherein the solvent is present in a quantity of from about 3% to 4%.
4. The process of claim 1 wherein the solvent is carbon tetrachloride.
5. The process of claim 1 wherein the solvent is water.

References Cited in the file of this patent

UNITED STATES PATENTS 2,539,238    Eaker _____ Jan. 23, 1951

OTHER REFERENCES

Technique of Organic Chemistry, volume III, Weissberger, 1950, pp. 438, 451, 477.